United States Patent
Lin et al.

(10) Patent No.: US 12,494,986 B2
(45) Date of Patent: Dec. 9, 2025

(54) METHOD FOR SYNCHRONIZING INFORMATION BETWEEN SWITCHES, AND ELECTRONIC DEVICE

(71) Applicant: NEW H3C TECHNOLOGIES CO., LTD., Zhejiang (CN)

(72) Inventors: Changwang Lin, Beijing (CN); Mengxiao Chen, Beijing (CN); Hao Li, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 0 days.

(21) Appl. No.: 18/567,060

(22) PCT Filed: Oct. 28, 2021

(86) PCT No.: PCT/CN2021/127193
§ 371 (c)(1),
(2) Date: Dec. 5, 2023

(87) PCT Pub. No.: WO2023/070475
PCT Pub. Date: May 4, 2023

(65) Prior Publication Data
US 2024/0275712 A1    Aug. 15, 2024

(51) Int. Cl.
*H04L 45/02* (2022.01)
*H04L 67/1095* (2022.01)
*H04L 67/1097* (2022.01)

(52) U.S. Cl.
CPC .......... *H04L 45/04* (2013.01); *H04L 67/1095* (2013.01); *H04L 67/1097* (2013.01)

(58) Field of Classification Search
None
See application file for complete search history.

(56) References Cited

U.S. PATENT DOCUMENTS

| 7,634,582 B2 | 12/2009 | Ovadia |
| 7,707,304 B1 | 4/2010 | Lolayekar et al. |
| 9,270,754 B2 | 2/2016 | Iyengar et al. |

(Continued)

FOREIGN PATENT DOCUMENTS

| CN | 1604556 A | 4/2005 |
| CN | 1890943 A | 1/2007 |

(Continued)

OTHER PUBLICATIONS

Cheng et al., "LRSD-BGP : A Software-Defined Routing Framework for Inter-Domain Fast Initial Link Setup", May 26, 2020, IEEE, 2020 IEEE International Black Sea Conference on Communications and Networking (BlackSeaCom) (2020, pp. 1-6) (Year: 2020).*

(Continued)

*Primary Examiner* — Davoud A Zand
(74) *Attorney, Agent, or Firm* — GREENBLUM & BERNSTEIN, P.L.C.

(57) ABSTRACT

The present application provides a method and apparatus for synchronizing information between switches. The method includes: acquiring to-be-synchronized target data; sending BGP routes carrying the target data through BGP sessions established between the switch with one or more designated switches, so that the target data is synchronized between the switch and target switches that need to synchronize with the switch.

17 Claims, 7 Drawing Sheets

(56) References Cited

U.S. PATENT DOCUMENTS

| | | | |
|---|---|---|---|
| 11,218,508 | B2 | 1/2022 | Dixit et al. |
| 2005/0175341 | A1 | 8/2005 | Ovadia |
| 2006/0133390 | A1 | 6/2006 | Sreekantiah et al. |
| 2009/0147692 | A1 | 6/2009 | Hasan et al. |
| 2019/0132280 | A1 | 5/2019 | Meuninck et al. |
| 2020/0007583 | A1 | 1/2020 | Dixit et al. |
| 2020/0213225 | A1 | 7/2020 | Han et al. |
| 2020/0220801 | A1* | 7/2020 | Ferguson ............... H04L 45/74 |
| 2021/0314291 | A1* | 10/2021 | Chandrashekhar ..... H04L 45/02 |
| 2022/0094637 | A1* | 3/2022 | Dutta ................... H04L 45/026 |
| 2022/0124022 | A1* | 4/2022 | Shenbagam .......... H04L 41/082 |

FOREIGN PATENT DOCUMENTS

| | | |
|---|---|---|
| CN | 101471940 A | 7/2009 |
| CN | 104506511 A | 4/2015 |
| CN | 104639630 A | 5/2015 |
| CN | 104822101 A | 8/2015 |
| CN | 107925613 A | 4/2018 |
| CN | 110011921 A | 7/2019 |
| CN | 111901240 A | 11/2020 |
| CN | 112219382 A | 1/2021 |
| CN | 112822103 A | 5/2021 |
| CN | 112867086 A | 5/2021 |
| CN | 113132227 A | 7/2021 |
| JP | 2003099385 A | 4/2003 |
| JP | 2007129702 A | 5/2007 |
| KR | 20140025571 A | 3/2014 |

OTHER PUBLICATIONS

State Intellectual Property Office of the People's Republic of China, Office Action and Search Report Issued in Application No. 202180003428X, Nov. 26, 2024, 12 pages.

Japanese Patent Office, Office Action Issued in Application No. 2023-569876, Oct. 22, 2024, 7 pages.

Wang Jianquan, "New Services on MSTP and Their Applications", ZTE Technology Journal, Dec. 2005 Vol.11 No. 6, 5 pages.

Boleslaw K. Szymanski et al, "Parallel network simulation under distributed Genesis", Seventeenth Workshop on Parallel and Distributed Simulation, 2003. (PADS 2003). Proceedings.Jun. 25, 2003, 8 pages.

European Patent Office, Extended European Search Report Issued in Application No. 21961840.2, Jun. 17, 2024, Germany, 12 pages.

ISA State Intellectual Property Office of the People's Republic of China, Written Opinion of the International Searching Authority Issued in Application No. PCT/CN2021/127193, Jul. 27, 2022, WIPO, 7 pages.

European Patent Office, Communication Issued in Application No. 21961840.2, Dec. 11, 2023, Germany, 1 pages.

ISA State Intellectual Property Office of Singapore, Notice of Correction Issued in Application No. 11202309091U, Dec. 3, 2023, 2 pages.

ISA State Intellectual Property Office of the People's Republic of China, International Search Report Issued in Application No. PCT/CN2021/127193, Jul. 27, 2022, WIPO, 4 pages.

Korean Intellectual Property Office, Office Action Issued in Application No. 10-2023-7040627, Aug. 4, 2025, 8 pages.

* cited by examiner

| IP Zone Name | IP Address | Route ID |
|---|---|---|

| MAC Address | Port Name | Route ID |
|---|---|---|

| Route ID | Enable |
|---|---|

METHOD FOR SYNCHRONIZING INFORMATION BETWEEN SWITCHES, AND ELECTRONIC DEVICE

CROSS REFERENCE TO RELATED APPLICATIONS

This application is a National Stage of International Application No. PCT/CN2021/127193, filed on Oct. 28, 2021, the disclosure of which is incorporated herein by reference in its entirety for all purposes.

TECHNICAL FIELD

The present application relates to network communication technology, and in particular, to methods and apparatuses for synchronizing information between switches applied in a Storage Area Network (SAN for short).

BACKGROUND

In a SAN, switches, as a network core, can be connected to hosts (served as Initiators) and/or storage devices (served as Targets). Here, devices such as the hosts and/or the storage devices connected to the switches may be referred to as access devices, and the switches may be referred to as access switches.

SUMMARY

Embodiments of the present application provide methods and electronic devices for synchronizing information between switches so as to realize information synchronization between switches in a SAN.

An embodiment of the present application provides a method of synchronizing information between switches in a Storage Area Network SAN. The method includes:
  acquiring, by any switch in the SAN, to-be-synchronized target data;
  sending BGP routes carrying the target data through BGP sessions established between the switch with one or more designated switches, so that the target data is synchronized between the switch and target switches that need to synchronize with the switch.

An embodiment of the present application further provides an electronic device. The electronic device includes: a processor and a machine readable storage medium, where
  the machine readable storage medium stores machine executable instructions executable by the processor;
  the processor is configured to execute the machine executable instructions to perform the steps in the disclosed method.

As can be known from the above technical solutions, in the embodiments of the present application, to-be-synchronized target data between switches in the SAN, such as IP service zone configuration information on access devices and/or device discovery information on access devices and/or information on whether switches support a default IP service zone, are automatically synchronized, so that all switches in the SAN that need to synchronize data with each other can detect changes in each other in time, such as a newly connected access device, newly added or changed IP service zone configuration information, and switches enabling or disabling default IP service zone functions, and relevant configuration can be adjusted intelligently in time, to realize plug-and-play and rapid fault detection, and finally assist in realization of no packet loss and high-throughput transmission of Ethernet in the SAN.

Further, in the embodiments of the present application, by extending the existing BGP to synchronize the switches in the SAN in a form of BGP routes, minor changes are made to the SAN, which is conducive to realizing interoperability and standardization between manufacturers.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
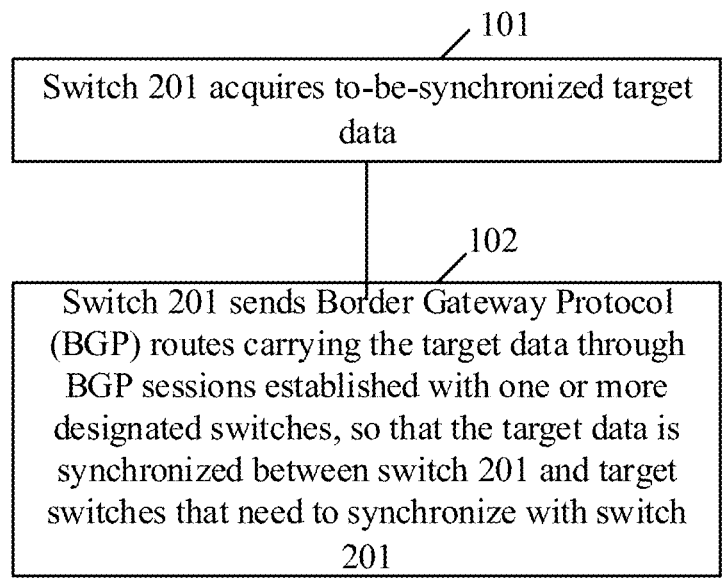
FIG. 1 is a flowchart illustrating a method according to an embodiment of the present application.

Currently, NVMe over RoCEv2 Network Control Optimization Technology Requirements and Test Specifications provide an interaction process and messages between access devices and switches, but do not provide how to synchronize information between the switches. NVMe is an abbreviation of Non-Volatile Memory express, and RoCEv2 is an abbreviation of Remote Direct Memory Access (RDMA for short) over Converged Ethernet version 2. However, in practice, information needs to be synchronized between the switches. For example, when storage device a1 is newly connected to switch s1, host a2 connected to switch s2 needs to know that storage device a1 is online so that host a2 can exchange data with storage device a1, and based on this, switch s1, when storage device a1 goes online, needs to synchronize the information of storage device a1 going online to switch s2 in time, so that switch s2 can forward the information to host a2. However, currently, the Network Control Optimization Technology Requirements and Test Specifications do not provide how to synchronize information between the switches.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present application. Rather, they are merely examples of apparatuses and methods consistent with some aspects of the present application as detailed in the appended claims.

The terms used in the present application are for the purpose of describing particular examples only, and are not intended to limit the present application. Terms determined by "a", "the" and "said" in their singular forms in the present application and the appended claims are also intended to include plurality, unless clearly indicated otherwise in the context.

In order to enable those skilled in the art to better understand the technical solutions provided by the embodiments of the present application, and make the objects, features and advantages of the embodiments of the present application more apparent, the technical solutions in the embodiments of the present application will be described in further detail below with reference to the accompanying drawings.

Figure 2:
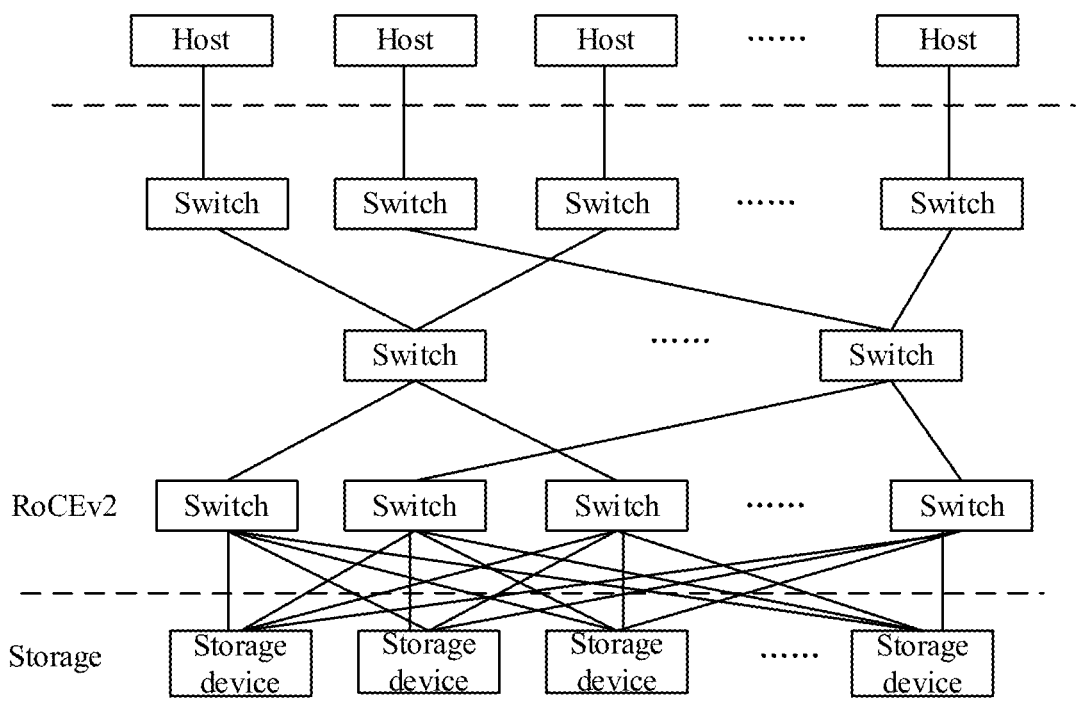
FIG. 2 is a schematic diagram illustrating a SAN according to an embodiment of the present application.

FIG. 1 is a flowchart illustrating a method according to an embodiment of the present application. As an embodiment, the method is applied to switches in an SAN. In some examples, the method is applied to any switch in an NVMe over RoCEv2 network from the SAN shown in FIG. 2. Here, the NVMe over RoCEv2 network is implemented based on a UDP layer in an Ethernet TCP/IP protocol. For convenience of description, a switch to which the method shown in FIG. 1 is applied may be denoted with one of switches shown in FIG. 2, that is, switch 201.

As shown in FIG. 1, the method may include the following steps:

At step 101, switch 201 acquires to-be-synchronized target data.

In the SAN, the to-be-synchronized target data may be IP service zone configuration information on access devices in the SAN, and/or,
the to-be-synchronized target data may be device discovery information on the access devices, and/or,
the to-be-synchronized target data may be information on whether switch 201 supports a default IP service zone.

For example, when IP service zone configuration information corresponding to at least one self-defined IP service zone is externally added to switch 201, or when IP service zone configuration information corresponding to at least one self-defined IP service zone that has been added to switch 201 is changed, the newly added IP service zone configuration information or the changed IP service zone configuration information is to be synchronized to target switches in the SAN that need to synchronize with switch 201 (such as switch 202 to switch n shown in FIG. 2), and the newly added IP service zone configuration information or the changed IP service zone configuration information can be determined as the to-be-synchronized target data. Specific contents of the IP service zone configuration information are not particularly limited in this embodiment, and will be described below with examples, which will not be repeated here for the time being.

For another example, when switch 201 is newly connected to an access device such as a host and/or a storage device, the newly connected access device may send an access message to switch 201, and the access message may be, for example, a Link Layer Discovery Protocol (LLDP for short) packet. Device discovery information on a locally newly connected access device is newly added to switch 201 according to the access message such as the LLDP packet. Switch 201 is to synchronize the device discovery information to target switches in the SAN that need to synchronize with switch 201, and the device discovery information can be determined as the to-be-synchronized target data. Specific contents of the device discovery information are not particularly limited in this embodiment, and will be described below with examples, which will not be repeated here for the time being.

For another example, when switch 201 enables or disables default IP service zone functions, switch 201 is to synchronize information on enabling or disabling the default IP service zone functions to target switches in the SAN that need to synchronize with switch 201, and the information on switch 201 enabling or disabling the default IP service zone functions (denoted as the information on whether switch 201 supports the default IP service zone) can be determined as the to-be-synchronized target data. Specific contents of the information on whether switch 201 supports the default IP service zone are not particularly limited in this embodiment, and will be described below with examples, which will not be repeated here for the time being.

It should be noted that the above are only examples for describing how to determine the to-be-synchronized target data. The examples of determining the to-be-synchronized target data illustrated above may or may not appear at the same time, which is not particularly limited in this embodiment. In addition, in this embodiment, specific contents of the target data are only examples and are not intended for limitation, and in this embodiment, the specific contents can be set according to actual service requirements in the SAN. This embodiment focuses only on that the to-be-synchronized target data is data in the SAN that is to be synchronized between switches. Specific form or contents of the to-be-synchronized target data is/are not particularly limited.

At step 102, switch 201 sends Border Gateway Protocol (BGP for short) routes carrying the target data through BGP sessions established with one or more designated switches, so that the target data is synchronized between switch 201 and target switches that need to synchronize with switch 201.

BGP does not support to-be-synchronized data between switches in the SAN, such as the IP service zone configuration information, the device discovery information on access devices, and the information on whether switch 201 supports the default IP service zone. In this embodiment, existing BGP is extended, so that the extended BGP supports the to-be-synchronized data between switches in the SAN. Based on the extended BGP, switch 201 can generate the BGP routes (also referred to as extended BGP routes) carrying the target data.

Afterwards, as described in step 102, switch 201 sends the BGP routes carrying the target data through the BGP sessions established with the designated switches, so that the target data is synchronized between switch 201 and the target switches that need to synchronize with switch 201.

Finally, data that is to be synchronized between switches in this embodiment is realized by using the extended BGP routes.

With regard to the designated switches in step 102, they may include at least one of the target switches, or at least one of non-target switches other than all the target switches. This is not particularly limited in this embodiment, and will be described below with examples, which will not be repeated here.

In addition, the BGP sessions in step 102 may include internal Border Gateway Protocol (IBGP) sessions or external Border Gateway Protocol (EBGP for short) sessions, which will be described below with examples, and will not be repeated here.

So far, the process shown in FIG. 1 is completed.

Through the process shown in FIG. 1, the to-be-synchronized target data between switches in the SAN, such as the IP service zone configuration information on access devices and/or the device discovery information on access devices and/or the information on whether switch 201 supports the default IP service zone, is automatically synchronized, so that all switches in the SAN that need to synchronize with each other can detect changes in each other in time, such as a newly connected access device, newly added or changed IP service zone configuration information, and a switch enabling or disabling the default IP service zone functions, and relevant configuration can be adjusted intelligently in time, to realize plug-and-play and rapid fault detection, and finally assist in realization of no packet loss and high-throughput transmission of Ethernet in the SAN.

Further, in this embodiment, by extending the existing BGP to synchronize the switches in the SAN in a form of BGP routes, minor changes are made to the SAN, which is conducive to realization of interoperability and standardization between manufacturers.

Next, the above step 102 will be described first with network examples, about how switch 201 sends the BGP routes carrying the target data through the BGP sessions established between switch 201 with the designated switches, so that the target data is synchronized between switch 201 and the target switches that need to synchronize with switch 201.

Embodiment 1

Figure 3:
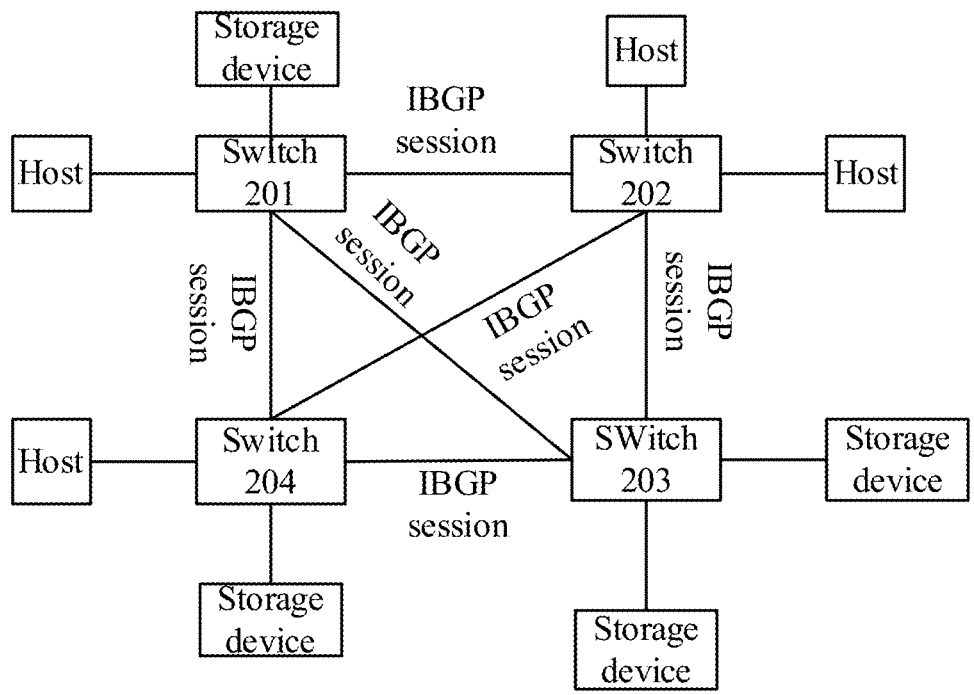
FIG. 3 is a schematic diagram illustrating a first network according to an embodiment of the present application.

FIG. 3 is a schematic diagram illustrating a first network according to an embodiment of the present application. The network shown in FIG. 3 is relatively simple. As shown in FIG. 3, if target switches that need to synchronize with switch 201 include switch 202 to switch 204, IBGP sessions are established among switch 201 to switch 204 in pairs.

Based on this, in step 102, sending, by switch 201, the BGP routes carrying the target data through the BGP sessions established with the designated switches may include: sending, by switch 201, the BGP routes carrying the target data respectively through an IBGP session established between switch 201 with each of switch 202 to switch 204 that need to synchronize with switch 201, which finally realizes the synchronization of the target data between switch 201 and switch 202 to switch 204.

In some examples, an IBGP session can be established between any two switches for sending a BGP route. In some examples, in order to prevent the same BGP route from being repeatedly sent in the SAN, switches can be prohibited from forwarding received BGP routes according to IBGP characteristics.

So far, the description of embodiment 1 is completed.

Embodiment 2

Figure 4:
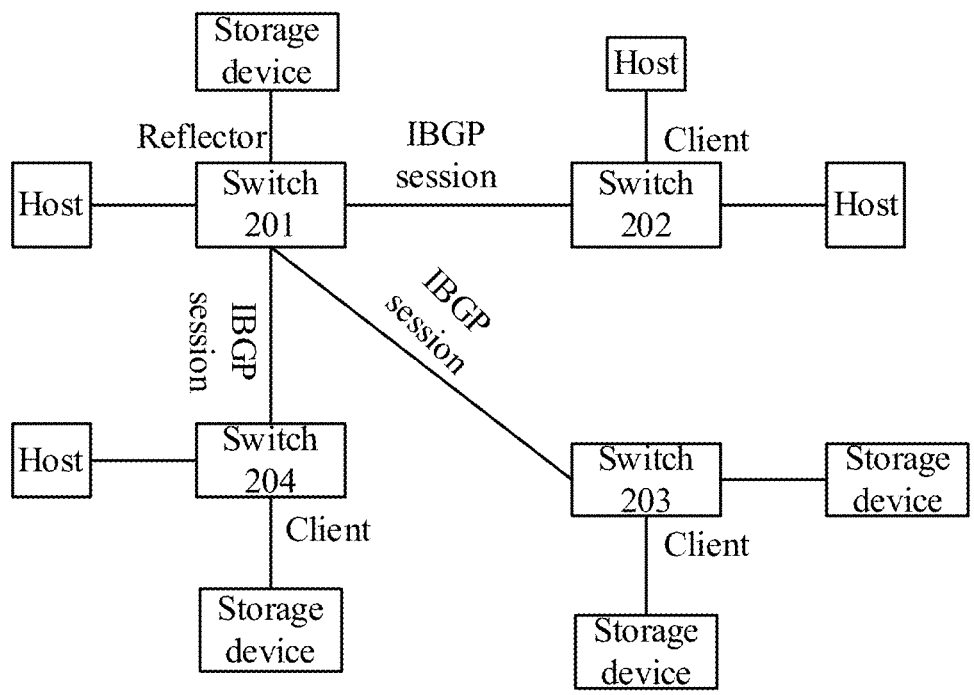
FIG. 4 is a schematic diagram illustrating a second network according to an embodiment of the present application.

In this embodiment, one of switch 201 and target switches that need to synchronize with switch 201 can be designated as a reflector, and the rest are clients of the reflector. FIG. 4 is a schematic diagram illustrating a second network according to an embodiment of the present application. As shown in FIG. 4, it is assumed that the target switches that need to synchronize with switch 201 include switch 202 to switch 204. In this embodiment, one of switch 201 to switch 204 can be designated as a reflector, and the rest are clients.

In this embodiment, an IBGP session is established between the reflector and each client, and no IBGP session is established between clients. The reflector forwards its generated or received BGP routes to each client through the IBGP session established with each client, but the client, after receiving the BGP routes from the reflector, does not forward the received BGP routes. The client, after generating a BGP route, sends the BGP route to the reflector through the IBGP session established with the reflector, so that the reflector forwards the received BGP route to other clients.

Taking switch 201 as a reflector and switch 202 to switch 204 as clients, in this embodiment, an IBGP session is established between switch 201 serving as a reflector and each client. No IBGP session is established between switch 202 to switch 204 serving as clients. Based on this, in step 102, sending, by switch 201, the BGP routes carrying the target data through the BGP sessions established with the designated switches may include: sending, by switch 201 serving as a reflector, the BGP routes carrying the target data to each client through the IBGP session established with each client, which finally realizes the synchronization of the target data between switch 201 and switch 202 to switch 204 that need to synchronize with switch 201. Here, switch 202 to switch 204 serving as clients, after receiving the BGP routes carrying the target data sent by switch 201 serving as a reflector, do not forward the received BGP routes so as to avoid the same BGP route from being repeatedly sent in the SAN.

Taking switch 202 as a reflector (similar to taking switch 203 and switch 204 as reflectors) and switch 201, switch 203 to switch 204 as clients, in this embodiment, in step 102, sending, by switch 201, the BGP routes carrying the target data through the BGP sessions established with the designated switches may include: sending, by switch 201 serving as a client, the BGP routes carrying the target data to switch 202 serving as a reflector through an IBGP session established with switch 202, so that switch 202, after receiving the BGP routes carrying the target data, forwards the received BGP routes to switch 203 through an IBGP session established with switch 203 and to switch 204 through an IBGP session established with switch 204, which finally realizes the synchronization of the target data between switch 201 and switch 202 to switch 204 that need to synchronize with switch 201. Switch 203 and switch 204 serving as clients, after receiving the BGP routes carrying the target data sent by switch 202 serving as a reflector, do not forward the received BGP routes so as to avoid the same BGP route from being repeatedly sent in the SAN.

So far, the description of embodiment 2 is completed.

Embodiment 3

In this embodiment, one non-target switch other than switch 201 and target switches that need to synchronize with switch 201 can be designated as a reflector, and switch 201 and target switches that need to synchronize with switch 201 can be clients of the reflector. In an example, the non-target switch here may be a non-access switch, that is, it is not connected to any access device, such as a host and a storage device.

Figure 5:
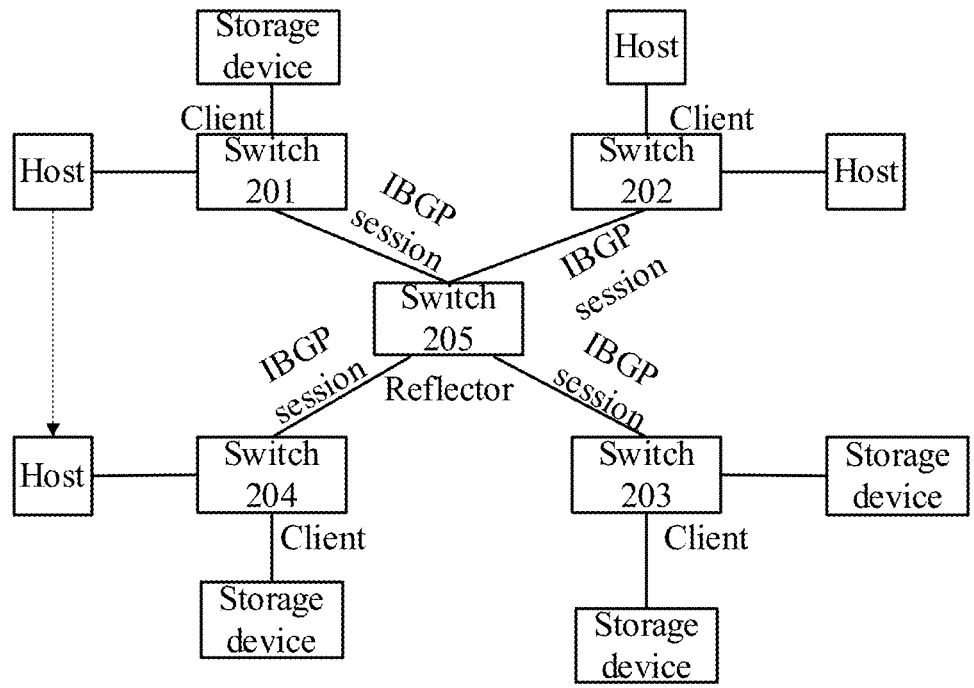
FIG. 5 is a schematic diagram illustrating a third network according to an embodiment of the present application.

FIG. 5 is a schematic diagram illustrating a third network according to an embodiment of the present application. As shown in FIG. 5, it is assumed that target switches that need to synchronize with switch 201 include switch 202 to switch 204. In this embodiment, one non-access switch (denoted with switch 205) can be designated as a reflector, and switch 201 to switch 204 are clients.

In this embodiment, an IBGP session is established between the reflector and each client, and no IBGP session is established between clients. The reflector forwards its generated or received BGP routes to each client through the IBGP session established with each client, but the client, after receiving the BGP routes from the reflector, does not forward the received BGP routes. The client, after generating a BGP route, sends the BGP route to the reflector through the IBGP session established with the reflector, so that the reflector forwards the received BGP route to other clients.

Taking switch 205 as a reflector and switch 201 to switch 204 as clients, in this embodiment, in step 102, sending, by switch 201, the BGP routes carrying the target data through the BGP sessions established with the designated switches may include: sending, by switch 201, the BGP routes carrying the target data to switch 205 serving as a reflector through an IBGP session established with switch 205, so that switch 205, after receiving the BGP routes carrying the target data, forwards the received BGP routes to switch 202 through an IBGP session established with switch 202, to switch 203 through an IBGP session established with switch 203 and to switch 204 through an IBGP session established with switch 204, which finally realizes the synchronization of the target data between switch 201 and switch 202 to switch 204 that need to synchronize with switch 201. Switch 202 to switch 204 serving as clients, after receiving the BGP routes carrying the target data sent by switch 205 serving as a reflector, do not forward the received BGP routes so as to avoid the same BGP route from being repeatedly sent in the SAN.

So far, the description of embodiment 3 is completed.

Embodiment 4

Figure 6:
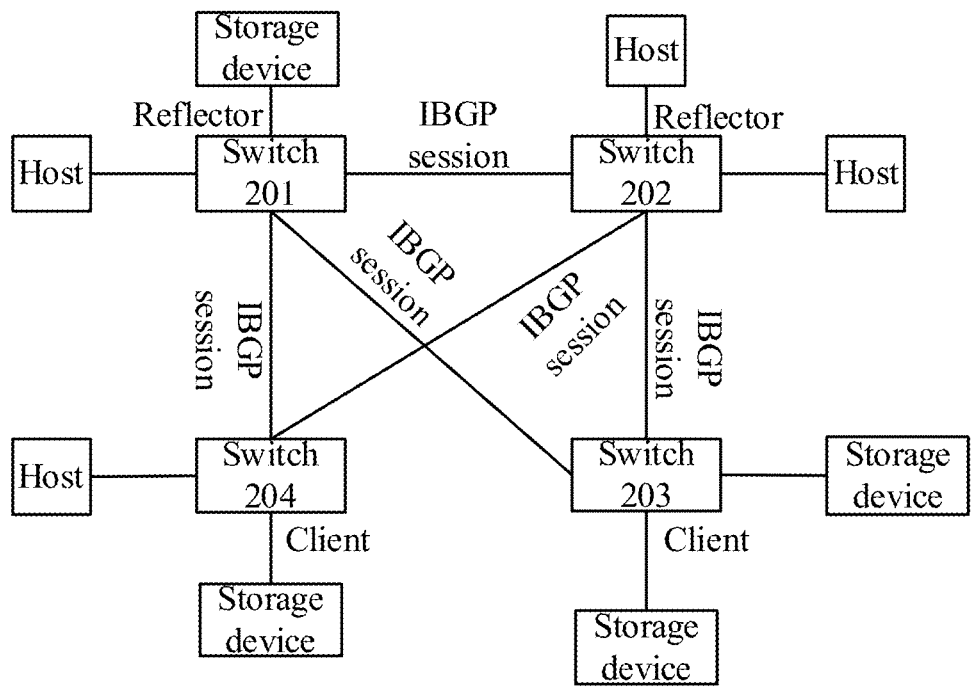
FIG. 6 is a schematic diagram illustrating a fourth network according to an embodiment of the present application.

In this embodiment, two or more of switch 201 and target switches that need to synchronize with switch 201 can be designated as reflectors, and the rest are clients of the reflectors. FIG. 6 is a schematic diagram illustrating a fourth network according to an embodiment of the present application. As shown in FIG. 6, it is assumed that target switches that need to synchronize with switch 201 include switch 202 to switch 204. In this embodiment, at least two of switch 201 to switch 204 can be designated as reflectors, and the rest are clients.

In this embodiment, an IBGP session is established between reflectors, an IBGP session is established between a reflector and a client, and no IBGP session is established between clients. The reflectors forward their generated or received BGP routes to each client through the IBGP session established with each client, but the client, after receiving the BGP routes from the reflectors, does not forward the received BGP routes. The client, after generating a BGP route, sends the BGP route to the reflectors through the IBGP sessions established with the reflectors, so that the reflectors forward the received BGP route to other clients.

Taking switch 201 and switch 204 as reflectors and switch 202 and switch 203 as clients, in this embodiment, an IBGP session is established between switch 201 and switch 204, and an IBGP session is established between each of switch 201 and switch 204 and each client. No IBGP session is established between switch 202 and switch 203.

Based on this, in step 102, sending, by switch 201, the BGP routes carrying the target data through the BGP sessions established with the designated switches may include: sending, by switch 201 serving as a reflector, the BGP routes carrying the target data to switch 204 serving as a reflector through the IBGP session established with switch 204, and sending, by switch 201 serving as a reflector, the BGP routes carrying the target data to each client through the IBGP session established with each client, which finally realizes the synchronization of the target data between switch 201 and switch 202 to switch 204 that need to synchronize with switch 201. Switch 202 and switch 203 serving as clients, after receiving the BGP routes carrying the target data sent by switch 201 serving as a reflector, do not forward the received BGP routes so as to avoid the same BGP route from being repeatedly sent in the SAN.

In some examples, when switch 204 serving as a reflector receives the BGP routes carrying the target data, in order to implement redundant backup, switch 204 can send the BGP routes carrying the target data to each client through the IBGP session established with each client, so that after switch 202 and switch 203 serving as clients receive the same BGP route, that is, the BGP routes carrying the target data, through different BGP sessions, the BGP route received through one of the BGP sessions is determined as an optimal route, and the BGP route received through another one of the BGP sessions is recorded as backup.

Afterwards, if switch 201 serving as a reflector fails, and the IBGP session between switch 203 serving as a client and switch 201 is disconnected, switch 203 may delete all routes sent by switch 201, but because switch 203 still records the same route sent by switch 204 serving as a reflector, switch 203 can use the recorded BGP route for communication to improve communication reliability.

Taking switch 202 and switch 204 as reflectors and switch 201 and switch 203 as clients, in this embodiment, an IBGP session is established between switch 202 and switch 204, and an IBGP session is established between each of switch 202 and switch 204 and each client. No IBGP session is established between switch 201 and switch 203. Based on this, in step 102, sending, by switch 201, the BGP routes carrying the target data through the BGP sessions established with the designated switches may include:

At step 601, switch 201 serving as a client sends the BGP routes carrying the target data through the IBGP session established with switch 202 serving as a reflector, so that switch 202, when receiving the BGP routes carrying the target data, sends the BGP routes carrying the target data to another client, that is, switch 203, through the IBGP session established with switch 203.

At step 602, switch 201 serving as a client sends the BGP routes carrying the target data through the IBGP session established with switch 204 serving as a reflector, so that switch 204, when receiving the BGP routes carrying the target data, sends the BGP routes carrying the target data to another client, that is, switch 203, through the IBGP session established with switch 203.

Finally, the synchronization of the target data between switch 201 and switch 202 to switch 204 that need to synchronize with switch 201 is realized.

It should be noted that, as described above, finally, switch 203 serving as a client receives the same BGP route, that is, the BGP routes carrying the target data, through different BGP sessions. Switch 203 serving as a client, after receiving the same BGP route, that is, the BGP routes carrying the target data, through different BGP sessions, determines the BGP route received through one of the BGP sessions as an optimal route, and records the BGP route received through another one of the BGP sessions as backup. Afterwards, if switch 202 serving as a reflector fails, and the IBGP session between switch 203 serving as a client and switch 202 is disconnected, switch 203 may delete all routes sent by switch 202, but because switch 203 still records the same route sent by switch 204 serving as a reflector, switch 203 can use the recorded BGP route for communication to improve communication reliability.

In this embodiment, the clients, after receiving the BGP routes carrying the target data sent by the reflectors, do not forward the received BGP routes so as to avoid the same BGP route from being repeatedly sent in the SAN.

So far, the description of embodiment 4 is completed.

Embodiment 5

In this embodiment, two or more non-target switches other than switch 201 and target switches that need to synchronize with switch 201 can be designated as reflectors, and switch 201 and target switches that need to synchronize with switch 201 can be clients of the reflectors. In an example, the non-target switches here may be non-access switches, that is, they are not connected to any access device, such as a host and a storage device.

Figure 7:
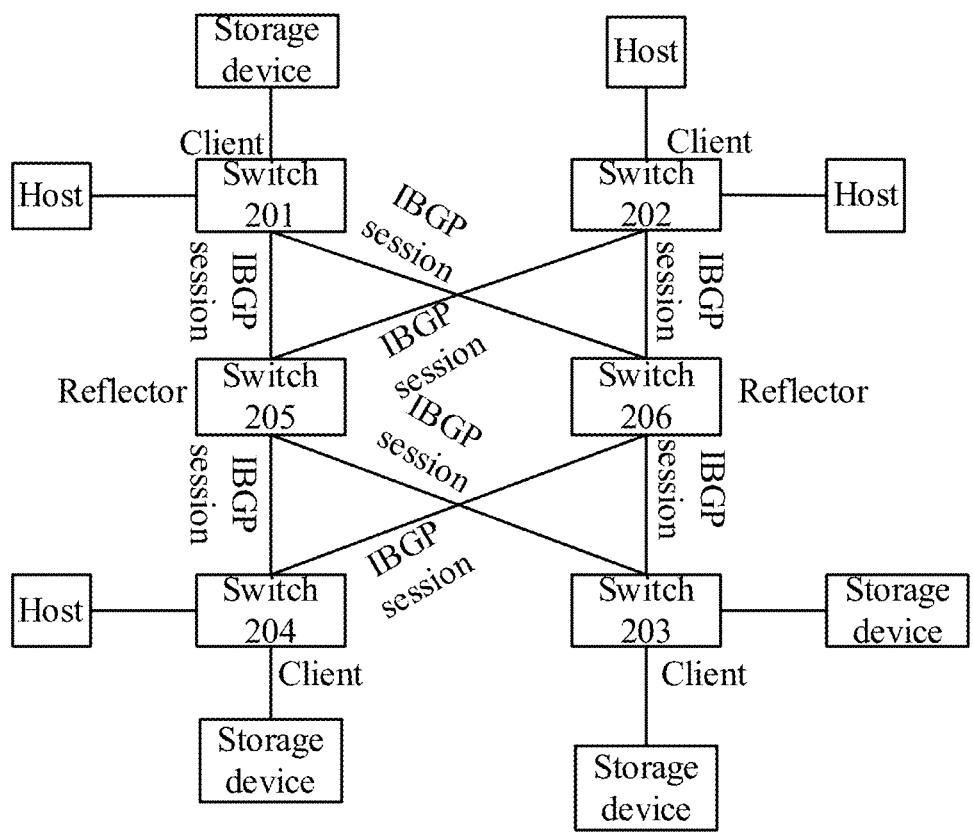
FIG. 7 is a schematic diagram illustrating a fifth network according to an embodiment of the present application.

FIG. 7 is a schematic diagram illustrating a fifth network according to an embodiment of the present application. As shown in FIG. 7, it is assumed that target switches that need to synchronize with switch 201 include switch 202 to switch 204. In this embodiment, two non-access switches (denoted with switch 205 and switch 206) can be designated as reflectors, and switch 201 to switch 204 are clients.

In this embodiment, IBGP sessions are established between the reflectors and each client, and no IBGP session is established between the reflectors and between the clients. The reflectors forward their generated or received BGP routes to each client through the IBGP session established with each client, but the client, after receiving the BGP routes from the reflectors, does not forward the received BGP routes. The client, after generating a BGP route, sends the BGP route to the reflectors through the IBGP sessions established with the reflectors, so that the reflectors forward the received BGP route to other clients.

Taking switch 205 and switch 206 shown in FIG. 7 as reflectors and switch 201 to switch 204 as clients, in this embodiment, in step 102, sending, by switch 201, the BGP routes carrying the target data through the BGP sessions established with the designated switches may include:

At step 701, switch 201 sends the BGP routes carrying the target data to switch 205 serving as a reflector through the IBGP session established with switch 205, so that switch 205, after receiving the BGP routes carrying the target data, forwards the received BGP routes to each client other than switch 201, that is, each of switch 202 to switch 204, through the IBGP session established with each client.

At step 702, switch 201 sends the BGP routes carrying the target data to switch 206 serving as a reflector through the IBGP session established with switch 206, so that switch 206, when receiving the BGP routes carrying the target data, forwards the received BGP routes to each client other than switch 201, that is, each of switch 202 to switch 204, through the IBGP session established with each client.

Finally, the synchronization of the target data between switch 201 and switch 202 to switch 204 that need to synchronize with switch 201 is realized by steps 701 to 702.

It should be noted that, in this embodiment, switch 202 to switch 204 serving as clients, after receiving the BGP routes carrying the target data sent by switch 205 or switch 206 serving as a reflector, do not forward the received BGP routes so as to avoid the same BGP route from being repeatedly sent in the SAN.

Further, in this embodiment, similar to embodiment 4, finally, switch 202 to switch 204 serving as clients receive the same BGP route, that is, the BGP routes carrying the target data, through different BGP sessions. Switch 202 to switch 204 serving as clients, after receiving the same BGP route, that is, the BGP routes carrying the target data, through different BGP sessions, determine the BGP route received through one of the BGP sessions as an optimal route, and record the BGP route received through another one of the BGP sessions as backup so as to implement redundant backup and improve reliability. For example, if switch 205 serving as a reflector fails, and the IBGP session between switch 203 serving as a client and switch 205 is disconnected, switch 203 may delete all routes sent by switch 205, but because switch 203 still records the same route sent by switch 206 serving as a reflector, switch 203 can use the recorded BGP route for communication to improve communication reliability.

So far, the description of embodiment 5 is completed.

Embodiment 6

Figures 8, 9, 10, 11:
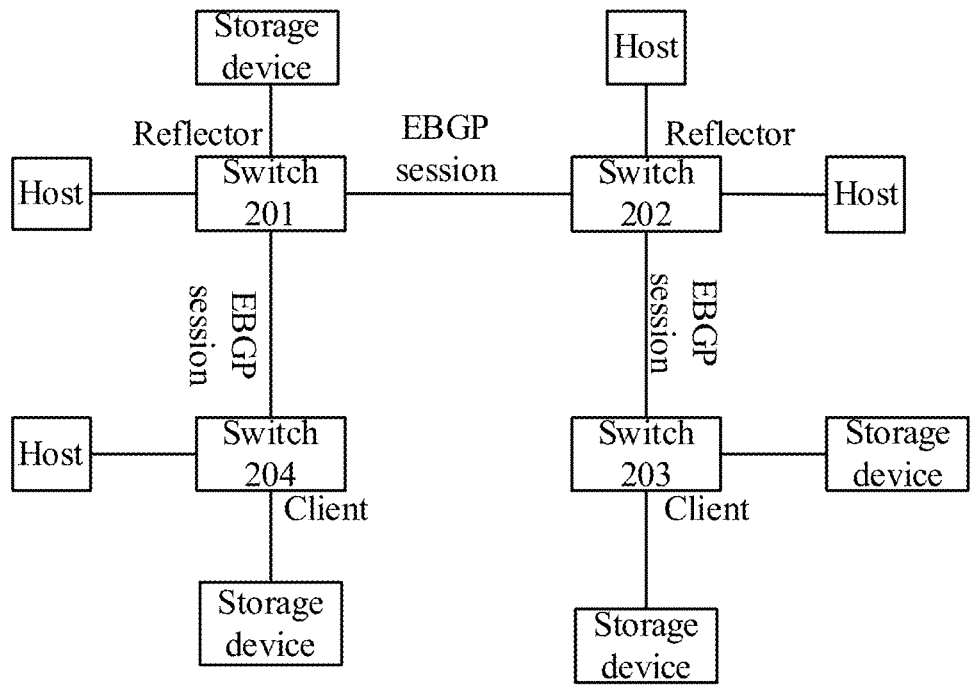
FIG. 8 is a schematic diagram illustrating a sixth network according to an embodiment of the present application.
FIG. 9 is a schematic diagram illustrating IP service zone configuration information according to an embodiment of the present application.
FIG. 10 is a schematic diagram illustrating device discovery information on access devices according to an embodiment of the present application.
FIG. 11 is a schematic diagram illustrating default IP service zone information according to an embodiment of the present application.

In this embodiment, an EBGP session is taken as an example. As shown in FIG. 8, in this embodiment, if target switches that need to synchronize with switch 201 include switch 202 to switch 204, an EBGP session can be established between switch 201 and switch 202, an EBGP session can be established between switch 201 and switch 204, and an EBGP session can be established between switch 202 and switch 203. Based on this, in step 102, sending, by switch 201, the BGP routes carrying the target data through the BGP sessions established with the designated switches may include:

At step 801, switch 201 sends the BGP routes carrying the target data to switch 202 through the EBGP session established with switch 202, so that switch 202, after receiving the BGP routes carrying the target data, forwards the received BGP routes to switch 203 through the EBGP session established with switch 203.

At step 802, switch 201 sends the BGP routes carrying the target data to switch 204 through the EBGP session established with switch 204.

Finally, the synchronization of the target data between switch 201 and switch 202 to switch 204 that need to synchronize with switch 201 is realized by steps 801 to 802.

So far, the description of embodiment 6 is completed.

It should be noted that, in the embodiments, it is to be just ensured that information synchronization between switches is performed according to the extended BGP, and specific network forms are not particularly limited. Networks illustrated in embodiments 1 to 6 are only examples and are not intended for limitation.

The BGP routes in step 202 will be described below:

In the embodiments, the BGP routes are carried in MP_REACH_NLRI attributes of BGP Update packets.

As an example, the MP_REACH_NLRI attributes may include at least: Address Family Identifier (AFI for short), Subsequent Address Family Identifier (SAFI for short), and NLRI.

AFI in the embodiments may be pre-designated and is different from a currently defined AI value. For example, in the embodiments, the AFI value is 6000.

SAFI in the embodiments may be pre-designated and is different from a currently defined SAFI value. For example, in the embodiments, the SAFI value is 254.

In some examples, the BGP routes are specifically carried in NLRI of the MP_REACH_NLRI attributes. As described above, the target data carried in the BGP routes includes at least: IP service zone configuration information on access devices, and/or device discovery information on access devices, and/or information on whether switch 201 supports a default IP service zone.

In some examples, the IP service zone configuration information, as shown in FIG. 9, includes at least: BGP route identifiers (Route IDs for short) of switch 201, IP service zone identifiers (also known as Zone Names), and IP Addresses of access devices to which the IP service zone configuration information belongs. Here, the IP Zone Names are identifiers of self-defined IP service zones, which are different from default IP service zones. It should be noted that, in the embodiments, the IP Addresses may be IPv4 addresses or IPv6 addresses, which is not particularly limited in the embodiments.

In some examples, the device discovery information on access devices, as shown in FIG. 10, includes at least: MAC Addresses of access devices, port identifiers (also known as Port Names) of ports on access devices connected to switch 201, and BGP Route IDs of switch 201. In some examples, the device discovery information on access devices shown in FIG. 10 may further include lengths of Port Names.

In the embodiments, the device discovery information on access devices further includes device attribute information on access devices.

In some examples, the device attribute information on access devices includes at least: IP Addresses of access devices (which can be IPv4 addresses or IPv6 addresses), state information on access devices (including at least online information or offline information), and role types of access devices (including at least storage systems and/or hosts). In the embodiments, the IP Addresses of access devices, the state information on access devices, and the role types of access devices may be respectively represented with TLVs, which is not limited here.

In some examples, whether a current BGP route and a previously received BGP route are the same route can be determined directly depending on the MAC Addresses of access devices, the Port Names of ports on access devices connected to switch 201, and the BGP Route IDs of switch 201. Therefore, as an example, it can be considered that the MAC Addresses of access devices, the Port Names of ports on access devices connected to switch 201, and the BGP Route IDs of switch 201 are a part of prefix in NLRI described above.

In the embodiments, the information on whether switch 201 supports the default IP service zone includes at least:

the BGP Route IDs of switch 201; or the BGP Route IDs of switch 201 and enable indication values (Enable for short). When an enable indication value is a first value, it is indicated that switch 201 supports the default IP service zone, and when an enable indication value is a second value, it is indicated that the switch does not support the default IP service zone. In the embodiments, both the BGP Route IDs and the enable indication values can be represented with TLVs. FIG. 11 illustrates a BGP Route ID of switch 201 and an enable indication value.

As described above, switch 202 that actively sends the BGP routes is taken as an example. In some examples, switch 202 can receive the BGP routes sent by other switches through a BGP session such as an IBGP session or an EBGP session, and corresponding route configuration information entries are newly added or updated locally based on the received BGP routes. The route configuration information entries are related to to-be-synchronized data carried in the received BGP routes. For example, if the to-be-synchronized data is newly added IP service zone configuration information, the route configuration information entries here may include the newly added IP service zone configuration information and the like.

In some examples, as described above, switch 202 can receive the BGP routes carrying the same to-be-synchronized data through different BGP sessions, and the optimal route can be determined according to a route preference manner.

Route withdrawal according to the embodiments of the present application will be described below:

In the embodiments, still taking switch 201 as an example, switch 201 has a demand for withdrawing at least one stored BGP route. For example, when a host or a storage device connected to switch 201 is offline, a BGP route corresponding to the offline host or storage device is to be withdrawn, that is, switch 201 determines that at least one stored BGP route is to be withdrawn. Switch 201, when determining that at least one stored BGP route is to be withdrawn, may first delete at least one stored BGP route that is to be withdrawn, and send a notification through a BGP session to instruct the target switches to delete at least one BGP route that is to be withdrawn and route configuration information entries corresponding to at least one BGP route.

Similarly, switch 201, when receiving at least one to-be-withdrawn BGP route through a BGP session, may delete at least one stored BGP route and route configuration information entries corresponding to at least one BGP route.

In some examples, at least one BGP route that is to be withdrawn is carried in MP_UNREACH_NLRI attributes of BGP Update packets. Here, for AFI and SAFI in the MP_UNREACH_NLRI attributes, reference may be made to the description of the MP_REACH_NLRI attributes described above.

The method according to the embodiments of the present application has been described above. Below, the method will be described again in conjunction with a specific example.

Figure 12:
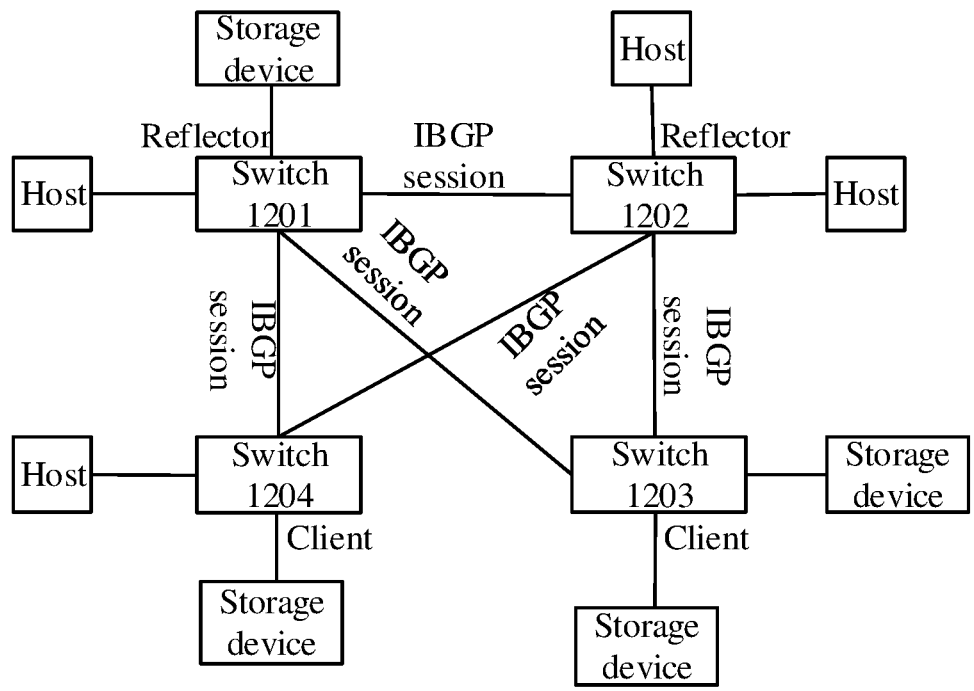
FIG. 12 is a schematic diagram illustrating a network example according to an embodiment of the present application.

FIG. 12 is a schematic diagram illustrating a network example according to an embodiment of the present application. In FIG. 12, switch 1201 and switch 1202 are configured as reflectors with the same Cluster ID. Switch 1203 and switch 1204 are configured as clients of the reflectors. Switch 1201 to switch 1204 are configured in the same AS and are IBGP peers to each other. Based on the description of embodiment 4, in FIG. 12, a BGP session is established respectively between switch 1201 and switch 1202, between switch 1201 and switch 1203, between switch 1201 and switch 1204, between switch 1202 and switch 1203, and between switch 1202 and switch 1204.

When IP service zone configuration of host B is added to switch 1201, switch 1201 acquires the newly added IP service zone configuration, generates and records a BGP route carrying the IP service zone configuration. Afterwards, switch 1201 sends the BGP route through the BGP sessions established with switch 1202, switch 1203, and switch 1204. Switch 1202 to switch 1204 receive, record and parse the BGP route so as to newly add IP service zone configuration entries of remote end, that is, host B, locally.

When the IP service zone configuration of host B recorded on switch 1201 is to be modified, switch 1201 updates the existing corresponding BGP route. Afterwards, switch 1201 sends the updated BGP route through the BGP sessions established with switch 1202, switch 1203, and switch 1204. Switch 1202 to switch 1204 receive, record and parse the updated BGP route so as to update the locally recorded IP service zone configuration entries of remote end. The updated IP service zone configuration entries are the same as the modified IP service zone configuration entries.

When the IP service zone configuration of host B recorded on switch 1201 is to be deleted, switch 1201 withdraws the existing corresponding BGP route. Afterwards, switch 1201 sends a BGP route withdrawal notification through the BGP sessions established with switch 1202, switch 1203, and switch 1204. Switch 1202 to switch 1204, after receiving the BGP route withdrawal notification, delete the recorded corresponding BGP route and the recorded corresponding IP service zone configuration entries of remote end, that is, host B.

It should be noted that, in the embodiments, when the IP service zone configuration of host B recorded on switch 1201 is to be modified, according to the method for deleting the IP service zone configuration of host B recorded on switch 1201, the existing corresponding BGP route can be first withdrawn and then the BGP route withdrawal notification is sent to switch 1202 to switch 1204 to instruct switch 1202 to switch 1204 to delete the recorded corresponding BGP route and the recorded corresponding IP service zone configuration entries of remote end, that is, host B. Afterwards, the operations when the IP service zone configuration of host B is added to switch 1201 are performed. How to specifically perform the operations depends mainly on whether the modified IP service zone configuration is a key feature, such as a feature parameter for determining whether the BGP route is the same as other routes (the feature parameter here may be IP service zone configuration information, or other self-defined parameter, etc., which is not particularly limited in the embodiments). If the modified IP service zone configuration is the key feature, the existing corresponding BGP route can be first withdrawn and then the IP service zone configuration of host B is added to switch 1201 to realize the updating. If the modified IP service zone configuration is not the key feature, as described above, the existing corresponding BGP route is directly updated and sent.

When switch 1204 is newly connected to an access device such as a host or a storage device, the newly connected access device, after going online, may first send an LLDP packet to switch 1204, and device discovery information on the newly connected access device is newly added to switch 1204 locally, which generates and records corresponding BGP route. Afterwards, switch 1204 serving as a client sends the BGP route to switch 1201 serving as a reflector through the BGP session established with switch 1201. In addition, switch 1204 sends the BGP route to switch 1202 serving as a reflector through the BGP session established with switch 1202. Switch 1201 reflects the received BGP route to switch 1203 serving as a client through the BGP session established with switch 1203. Switch 1202 reflects the received BGP route to switch 1203 through the BGP session established with switch 1203. Switch 1203 receives two same routes reflected by switch 1201 and switch 1202 to select an optimal route according to the BGP protocol standard and actual implementation.

It should be noted that, regardless of whether the optimal route is the BGP route reflected by switch 1201 or switch 1202, because route information (also referred to as to-be-synchronized data) carried in the BGP routes reflected by switch 1201 and switch 1202 is consistent, switch 1203 can parse the device discovery information on the access device newly connected to switch 1204 from the route information.

Based on this, if the optimal route is the BGP route reflected by switch 1201, when switch 1201 fails, the BGP session between switch 1203 and switch 1201 may be disconnected, and switch 1203 may delete all routes sent by switch 1201. However, at this time, since switch 1203 still stores the same route sent by switch 1202, the BGP route generated by switch 1204 still exists on switch 1203. Therefore, deploying two reflectors, switch 1201 and switch 1202, at the same time play a role of redundant backup, which can improve reliability.

When the device discovery information on the access device such as a host or a storage device connected to switch 1204 changes, the access device may send an LLDP packet to notify switch 1204, and switch 1204 updates the device discovery information on a locally connected access device and the recorded corresponding BGP route.

Afterwards, switch 1204 serving as a client sends the updated BGP route to switch 1201 serving as a reflector through the BGP session established with the switch 1201 and to switch 1202 serving as a reflector through the BGP session established with switch 1202.

Switch 1201 serving as a reflector reflects the received BGP route to switch 1203 serving as a client through the BGP session established with switch 1203.

Switch 1202 serving as a reflector reflects the received BGP route to switch 1203 serving as a client through the BGP session established with switch 1203.

Finally, switch 1203 receives two same routes reflected by switch 1201 and switch 1202, and selects the optimal route according to the BGP protocol standard and actual implementation. It should be noted that the change in the device discovery information on an access device is similar to the situation when the IP service zone configuration changes, which will not be described further.

If the access device such as a host or a storage device connected to switch 1204 is offline, and switch 1204 finds that corresponding device is offline, for example, LLDP is aging, or connection is broken, the existing BGP route may be withdrawn. Afterwards, switch 1204 serving as a client sends a route withdrawal notification to switch 1201 serving as a reflector through the BGP session established with switch 1201 and to switch 1202 serving as a reflector through the BGP session established with switch 1202.

Switch 1201 serving as a reflector reflects the route withdrawal notification to switch 1203 serving as a client through the BGP session established with switch 1203.

Switch 1202 serving as a reflector reflects the route withdrawal notification to switch 1203 serving as a client through the BGP session established with switch 1203.

Finally, switch 1203, after receiving the route withdrawal notifications reflected by switch 1201 and switch 1202, may delete corresponding BGP route, and modify the device state information corresponding to the BGP route to be offline.

The above description is based only on the IP service zone configuration and the device discovery information as an example, and other situations can be analogized, which will not be described here.

Figure 13:
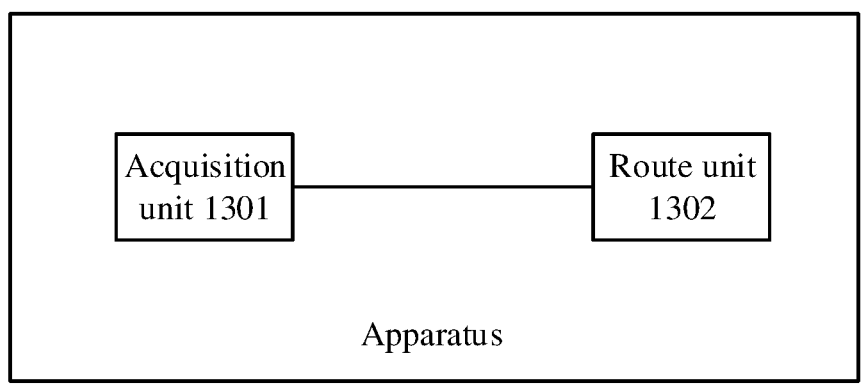
FIG. 13 is a structural diagram illustrating an apparatus according to an embodiment of the present application.

An apparatus according to the embodiments of the present application will be described below:

FIG. 13 is a structural diagram illustrating an apparatus according to an embodiment of the present application. The apparatus is applied to any switch in a SAN. As shown in FIG. 13, the apparatus may include:

- an acquisition unit 1301, configured to acquire to-be-synchronized target data;
- a route unit 1302, configured to send BGP routes carrying the target data through BGP sessions established between the switch with one or more designated switches, so that the target data is synchronized between the switch and target switches that need to synchronize with the switches.

In some examples, the target data includes at least:

- IP service zone configuration information on access devices, and/or device discovery information on access devices, and/or information on whether the switches support a default IP service zone.

In some examples, the IP service zone configuration information includes at least:

- BGP route identifiers (Route IDs) of the switches, IP Zone Names, and IP Addresses of access devices to which the IP service zone configuration information belongs, where the IP Zone Names are identifiers of self-defined IP service zones, which are different from default IP service zones.

In some examples, the device discovery information on access devices includes at least:

- MAC Addresses of access devices, Port Names of ports on access devices connected to the switches, and BGP Route IDs of the switches.

In some examples, the device discovery information on access devices further includes device attribute information on access devices; the device attribute information on access devices includes at least:

- IP Addresses of access devices, including IPv4 addresses or IPv6 addresses;
- state information on access devices, including at least online information or offline information;
- role types of access devices, including at least storage systems and/or hosts.

In some examples, the information on whether the switches support the default IP service zone includes at least:

- BGP Route IDs of the switches; or
- BGP Route IDs of the switches and enable indication values, where when an enable indication value is a first value, it is indicated that the switches support the default IP service zone, and when an enable indication value is a second value, it is indicated that the switches do not support the default IP service zone.

In some examples, the designated switches include at least one of the target switches; or

- at least one of non-target switches other than the switches and the target switches.

In the embodiments, the route unit is further configured to, when receiving BGP routes sent by other switches through the BGP sessions established with the designated switches, newly add or update corresponding route configuration information entries locally based on the received BGP routes, where the route configuration information entries are related to to-be-synchronized data carried in the received BGP routes.

In the embodiments, the route unit is further configured to, when receiving BGP routes carrying same to-be-synchronized data through different BGP sessions, determine an optimal route according to a route selection manner.

In the embodiments, the route unit is further configured to store the BGP routes, and when at least one stored BGP route is to be withdrawn, first delete the at least one stored BGP route that is to be withdrawn, and send a notification through the BGP sessions established with the designated switches to instruct the target switches to delete the at least one stored BGP route that is to be withdrawn and route configuration information entries corresponding to the at least one stored BGP route.

In the embodiments, the route unit is further configured to, when receiving at least one to-be-withdrawn BGP route through the BGP sessions established with the designated switches, delete at least one stored BGP route and route configuration information entries corresponding to the at least one stored BGP route.

In the embodiments, the BGP routes are carried in MP_REACH_NLRI attributes of BGP Update packets; Address Family Identifier AFI and Subsequent Address Family Identifier SAFI in the MP_REACH_NLRI attributes are pre-designated, and do not conflict with currently defined AI and SAFI values.

In the embodiments, the at least one stored BGP route that is to be withdrawn is carried in MP_UNREACH_NLRI attributes of BGP Update packets; Address Family Identifier AI and Subsequent Address Family Identifier SAFI in the MP_UNREACH_NLRI attributes are pre-designated, and do not conflict with currently defined AI and SAFI values.

So far, the structural description of the apparatus shown in FIG. 13 is completed.

Figure 14:
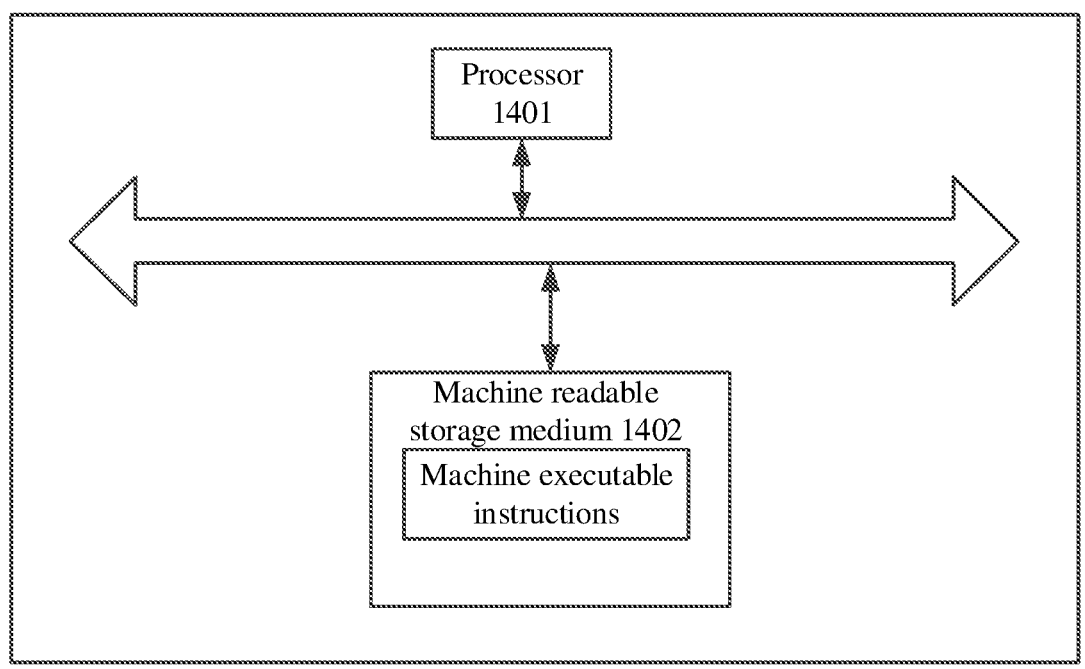
FIG. 14 is a structural diagram illustrating an electronic device according to an embodiment of the present application.

An embodiment of the present application provides a hardware structure of the apparatus shown in FIG. 13. FIG. 14 is a structural diagram illustrating an electronic device according to an embodiment of the present application. As shown in FIG. 14, the hardware structure may include: a processor 1401 and a machine readable storage medium 1402, where the machine readable storage medium stores machine executable instructions executable by the processor; the processor is configured to execute the machine executable instructions to implement the method disclosed in the embodiments of the present application.

Based on the same application concept as the above-mentioned method, an embodiment of the present application provides a machine readable storage medium, where several computer instructions are stored on the machine readable storage medium, and when the computer instructions are executed by a processor, the method disclosed in the embodiments of the present application can be implemented.

Exemplarily, the machine readable storage medium may be any electronic, magnetic, optical, or other physical storage apparatus, and may contain or store information, such as executable instructions, and data. For example, the machine readable storage medium may be: a Radom Access Memory (RAM for short), a volatile memory, a non-volatile memory, a flash memory, a storage drive (such as hard drive), a solid state hard disk, any type of storage disk (such as optical discs, and Digital Video Disks (DVDs for short)), or similar storage medium, or a combination of them.

The system, apparatus, module or unit set forth in the above examples may be specifically implemented by a computer chip or an entity, or implemented by a product having a certain function. A typical implementation device is a computer, and a specific form of the computer may be a personal computer, a laptop computer, a cellular phone, a camera phone, a smart phone, a personal digital assistant, a media player, a navigation device, an e-mail transceiver device, a game console, a tablet computer, a wearable device, or a combination of any of these devices.

For the convenience of description, during the description of the apparatus, it is divided into various units according to their functions, which are described respectively. Of course, when the present application is implemented, functions of each unit may be realized in one or more software and/or hardware.

Those skilled in the art should understand that the embodiments of the present application may be provided as methods, systems, or computer program products. Accordingly, the present application may take the form of a pure hardware embodiment, a pure software embodiment, or an embodiment combining software and hardware aspects. Furthermore, the embodiments of the present application may take the form of a computer program product implemented on one or more computer usable storage media (including, but not limited to, disk storage, Compact Disc Read-Only Memory (CD-ROM for short), optical storage, etc.) having computer usable program codes therein.

The present application is described with reference to flowcharts and/or block diagrams illustrating methods, apparatuses (or systems), and computer program products according to the embodiments of the present application. It should be understood that each process and/or block, and combinations of processes and/or blocks in the flowcharts and/or block diagrams can be implemented by computer program instructions. These computer program instructions may be provided to a processor of a general-purpose computer, a special-purpose computer, an embedded processing machine or other programmable data processing device to produce a machine, so that the instructions executed by the processor of the computer or other programmable data processing device produce an apparatus for realizing functions specified in one or more processes in a flowchart and/or one or more blocks in a block diagram.

Furthermore, these computer program instructions may be stored in a computer readable memory capable of directing a computer or other programmable data processing device to operate in a particular manner, so that the instructions stored in the computer readable memory produce a product including an instruction device. The instruction device can realize functions specified in one or more processes in a flowchart and/or one or more blocks in a block diagram.

These computer program instructions may be loaded on a computer or other programmable data processing device, so that a series of operation steps are performed on the computer or other programmable device to produce processes implemented by a computer, and the instructions executed on the computer or other programmable device provide steps for realizing functions specified in one or more processes in a flowchart and/or one or more blocks in a block diagram.

The above are only embodiments of the present application, which are not intended to limit the present application. For those skilled in the art, various modifications and variations can be made to the application. Any modification, equivalent replacement, improvement, etc. made within the spirit and principle of the present application shall fall into the scope of the claims of the present application.

The invention claimed is:

1. A method of synchronizing information between switches in a Storage Area Network (SAN) the method being applied to the switches in the SAN, and comprising:

acquiring to-be-synchronized target data;
sending Border Gateway Protocol (BGP) routes carrying the target data through BGP sessions established between the switch with one or more designated switches, so that the target data is synchronized between the switch and target switches that need to synchronize with the switch,
wherein the target data comprises at least: Internet Protocol (IP) service zone configuration information on one or more access devices, and/or device discovery information on the access devices, and/or information on whether the switch supports a default IP service zone; and
wherein the IP service zone configuration information comprises at least: a BGP route identifier (Route ID) of the switch, IP Zone Names, and IP Addresses of the access devices to which the IP service zone configuration information belongs, wherein the IP Zone Names are identifiers of self-defined IP service zones, which are different from the default IP service zone.

2. The method according to claim 1, wherein the device discovery information on the access devices comprises at least: Media Access Control (MAC) Addresses of the access devices, Port Names of ports on the access devices connected to the switch, and a BGP route identifier (Route ID) of the switch.

3. The method according to claim 2, wherein the device discovery information on the access devices further comprises device attribute information on the access devices; the device attribute information on the access devices comprises at least:
IP Addresses of the access devices, the IP Addresses comprising IPv4 addresses or IPV6 addresses;
state information on the access devices, the state information comprising at least online information or offline information;
role types of the access devices, the role types comprising at least storage systems and/or hosts.

4. The method according to claim 1, wherein the information on whether the switch supports the default IP service zone comprises at least:
a BGP route identifier (Route ID) of the switch; or
a BGP route identifier (Route ID) of the switch and an enable indication value,
wherein the enable indication value is a first value, and the switch supports the default IP service zone, or
the enable indication value is a second value, and the switch does not support the default IP service zone.

5. The method according to claim 1, wherein the designated switches comprise at least one target switch; or
the designated switches comprise at least one non-target switch other than the switch and the target switches.

6. The method according to claim 1, further comprising:
in response to receiving, through the BGP sessions established between the switch with the designated switches, BGP routes from other switches, newly adding or updating corresponding route configuration information entries locally based on the received BGP routes, wherein the route configuration information entries are related to to-be-synchronized data carried in the received BGP routes.

7. The method according to claim 1, further comprising:
in response to receiving BGP routes carrying same to-be-synchronized data through different BGP sessions, determining an optimal route according to a route selection manner.

8. The method according to claim 1, further comprising:
storing the BGP routes;
in response to determining that at least one stored BGP route is to be withdrawn, deleting the at least one stored BGP route that is to be withdrawn, and sending a notification through the BGP sessions established between the switch with the designated switches to instruct the target switches to delete the at least one stored BGP route that is to be withdrawn and route configuration information entries corresponding to the at least one stored BGP route.

9. The method according to claim 1, further comprising:
in response to receiving at least one BGP route to be withdrawn through the BGP sessions established between the switch with the designated switches, deleting the at least one BGP route stored locally and route configuration information entries corresponding to the at least one BGP route.

10. The method according to claim 1, wherein the BGP sessions comprise:
internal Border Gateway Protocol (IBGP) sessions or external Border Gateway Protocol (EBGP) sessions.

11. The method according to claim 1, wherein the BGP routes are carried in MP_REACH_NLRI attributes of BGP Update packets; Address Family Identifier (AFI) and Subsequent Address Family Identifier (SAFI) in the MP_REACH _NLRI attributes are pre-designated, and do not conflict with currently defined AFI and SAFI values.

12. The method according to claim 8, wherein the at least one stored BGP route that is to be withdrawn is carried in MP_UNREACH_NLRI attributes of BGP Update packets; Address Family Identifier (AFI) and Subsequent Address Family Identifier (SAFI) in the MP_UNREACH_NLRI attributes are pre-designated, and do not conflict with currently defined AFI and SAFI values.

13. The method according to claim 9, wherein the at least one stored BGP route that is to be withdrawn is carried in MP_UNREACH_NLRI attributes of BGP Update packets; Address Family Identifier (AFI) and Subsequent Address Family Identifier (SAFI) in the MP_UNREACH_NLRI attributes are pre-designated, and do not conflict with currently defined AFI and SAFI values.

14. An electronic device, comprising: a processor and a machine readable storage medium, wherein
the machine readable storage medium stores machine executable instructions executable by the processor;
the processor is configured to execute the machine executable instructions to implement operations comprising:
acquiring to-be-synchronized target data;
sending Border Gateway Protocol (BGP) routes carrying the target data through BGP sessions established between a switch in a Storage Area Network (SAN) with one or more designated switches, so that the target data is synchronized between the switch and target switches that need to synchronize with the switch,
wherein the target data comprises at least: Internet Protocol (IP) service zone configuration information on one or more access devices, and/or device discovery information on the access devices, and/or information on whether the switch supports a default IP service zone; and
wherein the IP service zone configuration information comprises at least: a BGP route identifier (Route ID) of the switch, IP Zone Names, and IP Addresses of the access devices to which the IP service zone configuration information belongs, wherein the IP Zone Names are identifiers of self-defined IP service zones, which are different from the default IP service zone.

15. The electronic device according to claim 14, wherein
the device discovery information on the access devices comprises at least: Media Access Control (MAC) Addresses of the access devices, Port Names of ports on the access devices connected to the switch, and a BGP route identifier (Route ID) of the switch; and
the information on whether the switch supports the default IP service zone comprises at least:
a BGP route identifier (Route ID) of the switch; or
a BGP route identifier (Route ID) of the switch and an enable indication value,
wherein the enable indication value is a first value, and the switch supports the default IP service zone, or
the enable indication value is a second value, and the switch does not support the default IP service zone.

16. The electronic device according to claim 14, the operations further comprising:
in response to receiving, through the BGP sessions established between the switch with the designated switches, BGP routes from other switches, newly adding or updating corresponding route configuration information entries locally based on the received BGP routes, wherein the route configuration information entries are related to to-be-synchronized data carried in the received BGP routes.

17. The electronic device according to claim 14, wherein the BGP routes are carried in MP_REACH _NLRI attributes of BGP Update packets; Address Family Identifier (AFI) and Subsequent Address Family Identifier (SAFI) in the MP_REACH _NLRI attributes are pre-designated, and do not conflict with currently defined AFI and SAFI values.

* * * * *